US007445653B2

(12) United States Patent
Trautmann et al.

(10) Patent No.: US 7,445,653 B2
(45) Date of Patent: Nov. 4, 2008

(54) CENTRIFUGAL OIL SEPARATOR

(75) Inventors: Pius Trautmann, Dingolfing (DE); Michael Durst, Frankenhardt (DE)

(73) Assignee: Mann & Hummel GmbH, Ludwigsburg (DE)

( * ) Notice: Subject to any disclaimer, the term of this patent is extended or adjusted under 35 U.S.C. 154(b) by 345 days.

(21) Appl. No.: 11/177,345

(22) Filed: Jul. 11, 2005

(65) Prior Publication Data

US 2006/0090430 A1 May 4, 2006

Related U.S. Application Data

(63) Continuation of application No. PCT/EP2004/050010, filed on Jan. 9, 2004.

(30) Foreign Application Priority Data

Jan. 11, 2003 (DE) ................................ 103 00 729

(51) Int. Cl.
*F01M 13/04* (2006.01)
*B01D 45/14* (2006.01)

(52) U.S. Cl. ............................ 55/345; 55/402; 55/437; 55/473

(58) Field of Classification Search ........... 55/345–348, 55/400–409, 437, 438, 440, 442, 443, 471, 55/473, DIG. 19; 123/572, 198 E; 95/270
See application file for complete search history.

(56) References Cited

U.S. PATENT DOCUMENTS 2,335,420 A * 11/1943 Jones ........................ 184/6.24
2,575,568 A 11/1951 Topanelian
4,361,490 A 11/1982 Saget
6,536,211 B1 * 3/2003 Borgstrom et al. ............ 60/311
6,925,993 B1 * 8/2005 Eliasson et al. ............. 123/572
7,056,363 B2 * 6/2006 Carlsson et al. ............... 55/406
2003/0178014 A1 * 9/2003 Sauter et al. ................ 123/572
2003/0233932 A1 * 12/2003 Ekeroth ......................... 95/12
2003/0233939 A1 * 12/2003 Szepessy et al. .............. 95/270
2005/0198932 A1 * 9/2005 Franzen et al. ................ 55/406

FOREIGN PATENT DOCUMENTS

DE 100 44 615 A1 4/2002
EP 0 287 462 A2 10/1988
EP 0 516 608 A1 12/1992
WO WO 02/20954 A1 * 3/2002

OTHER PUBLICATIONS

International Search Report, completed Jul. 27, 2004.

* cited by examiner

*Primary Examiner*—Frank M. Lawrence
(74) *Attorney, Agent, or Firm*—Crowell & Moring LLP

(57) ABSTRACT

A centrifugal oil separator which includes a disk separator disposed in a housing and has a plurality of spaced disks between which paths of flow for a gas to be cleaned are provided. The paths of flow connect an intake space located at the radial exterior of the disk separator with an inner, axial discharge channel. The intake space is supplied with pressurized gas via a rotation element that is configured as a compressor wheel and that is disposed in the area of an axial end face of the disk separator.

6 Claims, 2 Drawing Sheets

CENTRIFUGAL OIL SEPARATOR

CROSS REFERENCE TO RELATED APPLICATIONS

This application is a continuation of international patent application no. PCT/EP2004/050010, filed Jan. 9, 2004, designating the United States of America and published in German as WO 2004/063538 on Jul. 29, 2004, the entire disclosure of which is incorporated herein by reference. Priority is claimed based on Federal Republic of Germany patent application no. DE 103 00 729.6, filed Jan. 11, 2003.

BACKGROUND OF THE INVENTION

This invention relates to a centrifugal oil separator with a housing enclosing a plate separator comprising a plurality of spaced plates forming between them flow paths for a gas to be cleaned.

Published U.S. Patent Application No. US 2003/0178014 A1 (=DE 100 44 615) discloses a centrifugal oil separator for separating entrained oil from gases vented from the crankcase of an internal combustion engine. The centrifugal oil separator comprises a rotatably mounted and drivable plate separator in a separator housing composed of a plurality of approximately conical plates stacked one above the other and held together with a distance between them, thereby forming flow channels between adjacent plates of the plate separator. Between the plates, ribs or pins be applied to the top or bottom side of the plates to guide the flow and to stabilize the stack of plates. The venting gas flows radially through the plate separator from the outside to the inside, whereupon the droplets of oil in the venting gas are deposited on the bottom side of the plates and are thrown radially outward by the rotational movement of the plate separator due to the centrifugal forces generated by the rotational motion of the plate separator and due to the oblique inclination of the plate walls, and the droplets are discharged through an outlet opening provided in the bottom of the separator housing.

Due to the rotational movement of the plate separator, flows directed essentially radially outward may develop in the flow paths between adjacent plates, counteracting the flow of the venting gas from the oncoming flow side which is on the outside radially to an axial outflow channel which is on the inside radially. To nevertheless ensure an unambiguously defined direction of flow from the outside to the inside radially, a minimum pressure gradient must prevail between the oncoming flow side and the discharge side so that despite the rotation of the plate separator, a main direction of flow can develop from the outside to the inside. In such a case, it is unavoidable that a substantial pressure drop will occur across the oil separator.

SUMMARY OF THE INVENTION

The object of the present invention is to provide a centrifugal separator in which the pressure drop is minimized.

This and other objects are achieved in accordance with the present invention by providing a centrifugal oil separator comprising a plate separator arranged in a housing, said plate separator comprising a plurality of spaced apart plates which form flow paths between them for a gas that is to be cleaned, said flow paths connecting an intake space situated at the radial exterior of the plate separator, to which the gas to be cleaned is supplied through an intake opening in the housing, with an axial discharge channel situated at the radial interior of the plate separator; said oil separator further comprising a rotational element arranged in said housing, wherein the rotational element is constructed as a compressor wheel arranged adjacent an axial end face of the plate separator, said compressor wheel having a suction side and a discharge side, said suction side being supplied with gas via the intake opening, and said discharge side communicating with the intake space. Further advantageous and preferred embodiments are described in the following description.

In an oil separator according to the present invention, in addition to the plate separator, a rotational element designed as a compressor wheel is also provided in the housing and is arranged in the area of an axial end of the plate separator. Gas to be cleaned is supplied to the compressor wheel via an inlet opening in the housing. The supplied gas is compressed by the compressor wheel to an elevated pressure, and the delivery side of the compressor wheel (i.e., the outflow side of the compressor wheel) is connected and/or optionally even identical to the intake space of the plate separator. The compressor wheel forms a pressure generator that is integrated into the centrifugal oil separator and aids in minimizing the pressure drop between the inlet and outlet sides of the oil separator. An elevated pressure is generated by the compressor on the oncoming flow side of the plate separator, which supports the radial flow of gas through the plate separator from the outside to the inside. Even when the plate separator is rotated, the elevated pressure on the oncoming flow side, which has been increased by the compressor wheel, enables the gas to flow radially through the plate separator from the outside to the inside.

In one advantageous embodiment, the compressor wheel has rotating paddles or vanes which are connected to one of the end plates of the plate separator. The plate separator advantageously is rotatably mounted in the housing and is driven by a drive motor provided for it, whereby whenever the plate separator is rotated, the compressor wheel is also driven automatically and the gas supplied is conveyed by the compressor wheel into the intake space and is compressed to an elevated pressure. In this embodiment, a separate drive for the compressor wheel may be omitted.

In accordance with an alternative embodiment, however, it may be desirable for the compressor wheel to be designed such that it is decoupled from the plate separator and for the compressor wheel to be mounted so as to be rotatable independently of the plate separator and to be driven via a motor provided for it. In this embodiment, the plate separator may also be mounted in the housing of the oil separator in a rotational fixed manner. Optionally, however, the plate separator may be mounted so as to be rotatable independently of the compressor wheel in the housing.

In a one-piece embodiment of the compressor wheel with the end plate of the plate separator, in contrast with the state of the art, a relative pressure increase is achieved on the intake side of the plate separator due to the form or configuration of the compressor wheel which has been optimized for compression, whereby the total moving mass is increased only slightly by adding the mass of the compressor wheel. The drive power for rotating the plate separator and the compressor wheel, however, may remain essentially the same for this purpose.

BRIEF DESCRIPTION OF THE DRAWINGS

The invention will be described in further detail hereinafter with reference to illustrative preferred embodiments shown in the accompanying drawing figures in which.

DETAILED DESCRIPTION OF PREFERRED EMBODIMENTS

Figure 1:
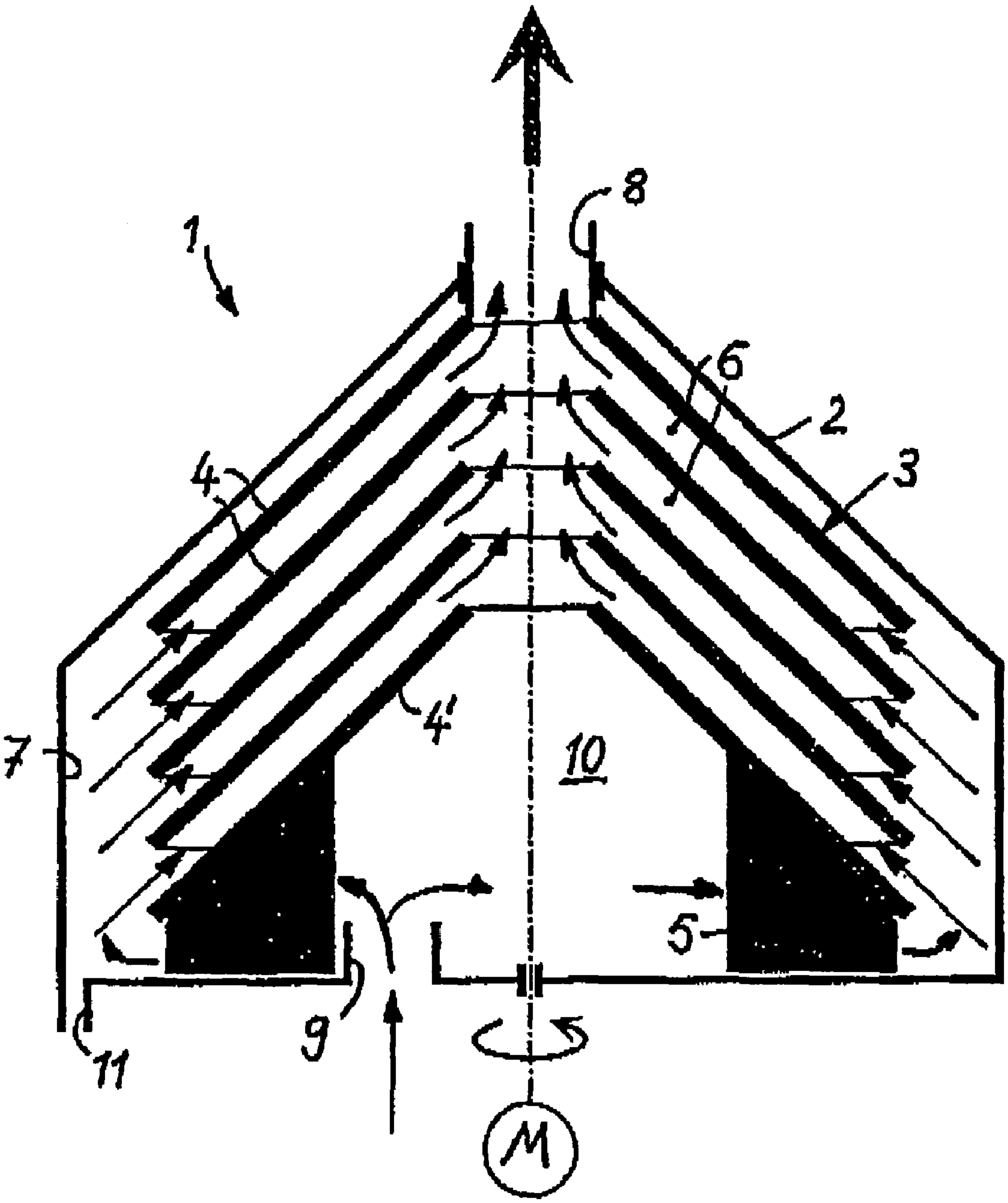
FIG. 1 is a schematic sectional view through a centrifugal oil separator with a plate separator and a compressor wheel arranged in the area of one end of the plate separator.

The centrifugal oil separator 1 shown in FIG. 1 comprises a plate separator 3 which is rotatably mounted in the housing 2 and can be driven by a motor M. The plate separator 3 comprises a plurality of substantially conical plates 4 stacked one above the other and arranged with a distance between them, thus forming flow paths 6 between the plates. The plate separator 3 is surrounded radially by an intake space 7 which is formed between a cylindrical inside wall of the housing 2 and the radial outside of the plate separator. The plate separator 3 has oncoming flow from the outside radially through the oncoming flow space 7, such that the gas to be vented flows radially inwardly along the flow path 6 between the neighboring plates 4 as indicated in the direction of the arrows and is discharged axially as cleaned gas and exhausted from the housing 2 through an axially extending central discharge channel. Because of the conical shape of the plates 4, the flow paths 6 between adjacent plates also have an axial component in addition to the radial component. To guide the flow between the plates and to stabilize the stack of plates, ribs or pins may also be applied to the top or bottom side of the plates.

In the area of the end plate 4' of the plate separator adjacent to the bottom of the housing, a compressor wheel 5 is rotatably mounted and advantageously may be fixedly connected to the end plate 4' such that it rotates together with the plate separator 3. The compressor wheel 5 is, like the plate separator 3, also surrounded radially by the intake space 7. The compressor wheel 5 conveys vented gas, which is supplied through an axial inlet opening 9 and initially flows into a radially inwardly located central inlet chamber 10, radially outwardly from central inlet chamber 10 to the radially outwardly located intake space 7. The incoming vent gas is compressed by the compressor wheel 5 to a higher pressure under which the vented gas flows radially inward from the intake space 7 through the flow paths 6 between the plates 4. During the process, any oil droplets present in the vented gas can deposit on the walls of the plates 4 and flow radially outward into the intake space 7 due to the rotation of the plate separator 3 and because of the centrifugal forces as well as the inclined position of the plate. The oil that is separated can be discharged from the housing of the oil separator through a drain opening 11 provided in the bottom of the housing 2 in the area of the intake space 7. The oil droplets which collect at the bottom of the intake space 7 are exhausted from the housing 2 under pressure through the drain opening 11 because of the relatively elevated pressure which prevails in the intake space 7.

Figure 2:
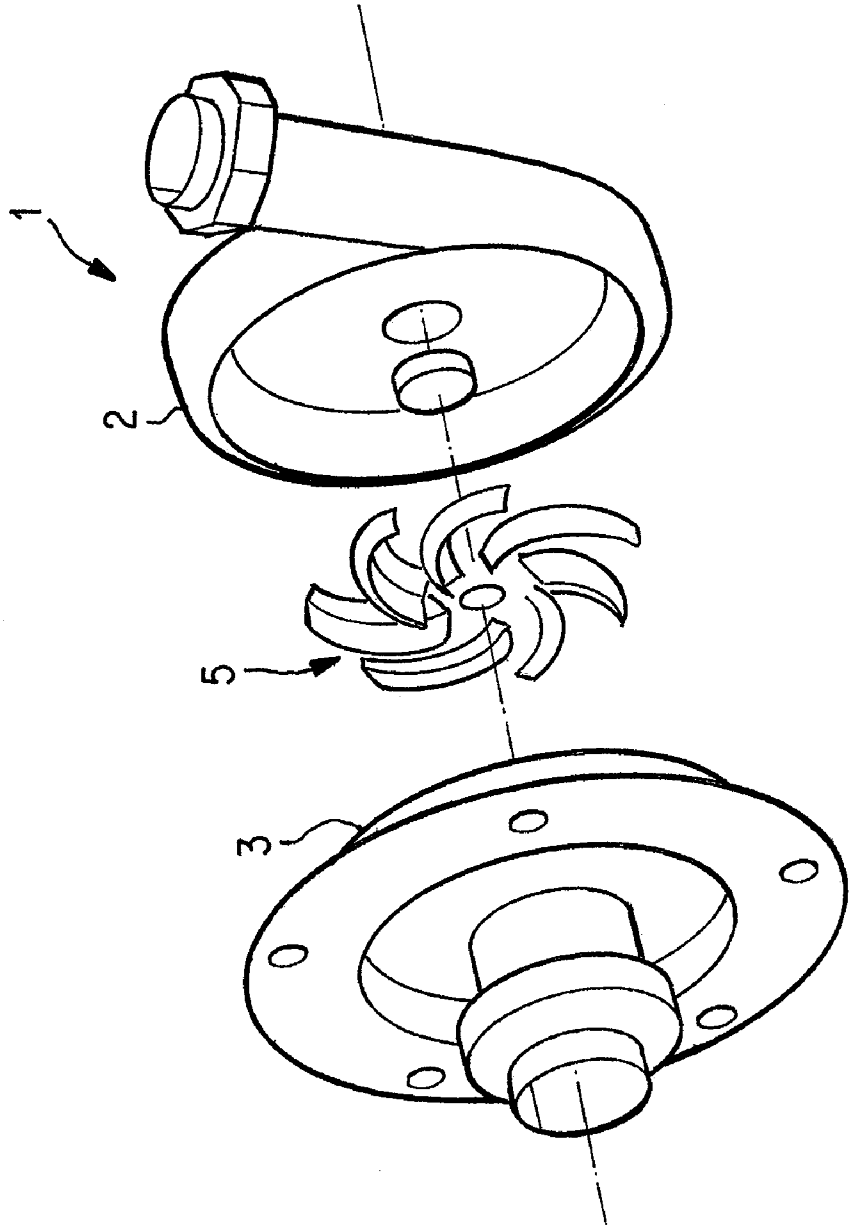
FIG. 2 is a perspective diagram of a centrifugal oil separator with a compressor wheel constructed as a centrifugal pump.

FIG. 2 shows the blades or vanes of the compressor wheel 5, which is rotatably mounted in the housing 2 of the oil separator 1. The compressor wheel 5 may also be constructed and driven independently of the plate separator. The plate separator 3 is only suggested in FIG. 2 and is located in the area axially adjacent the compressor wheel 5.

The centrifugal oil separator of the invention can be used in particular for separation of oil from venting gases from a crankcase in an internal combustion engine. In addition, however, it is also possible to use the centrifugal oil separator of the invention in other fields of technology in which separation of droplets from gas streams is to be performed.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A centrifugal oil separator comprising a plate separator arranged in a housing, said plate separator comprising a plurality of spaced apart plates which form flow paths between them for a gas that is to be cleaned, said flow paths connecting an intake space situated at the radial exterior of the plate separator, to which the gas to be cleaned is supplied through an intake opening in the housing, with an axial discharge channel situated at the radial interior of the plate separator; said oil separator further comprising a rotational element arranged in said housing, wherein the rotational element is constructed as a compressor wheel arranged adjacent an axial end face of the plate separator, said compressor wheel having a suction side and a discharge side, said suction side being supplied with gas via the intake opening, and said discharge side communicating with the intake space, and said compressor wheel comprising rotating vanes which are connected to an end plate of the plate separator.

2. A centrifugal oil separator according to claim 1, wherein the compressor wheel is a centrifugal pump which is constructed independently of the plate separator.

3. A centrifugal oil separator according to claim 1, wherein the plate separator is rotatably mounted in the housing and is driven by a motor.

4. A centrifugal oil separator according to claim 1, wherein the plates of the plate separator constructed to be conical in form.

5. A centrifugal oil separator according to claim 1, wherein a discharge opening for separated oil is provided in the intake space.

6. A centrifugal oil separator according to claim 1, wherein the intake of said separator is connected to a crankcase of an internal combustion engine such that crankcase gases from the crankcase are vented through the separator.

* * * * *